(12) United States Patent
Aust

(10) Patent No.: US 9,988,010 B2
(45) Date of Patent: Jun. 5, 2018

(54) SPACER FABRIC HAVING HINGE FUNCTION

(71) Applicant: Lisa Draexlmaier GmbH, Vilsbiburg (DE)

(72) Inventor: Stefan Aust, Hohenthann (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 114 days.

(21) Appl. No.: 15/081,160

(22) Filed: Mar. 25, 2016

(65) Prior Publication Data

US 2016/0280174 A1 Sep. 29, 2016

(30) Foreign Application Priority Data

Mar. 27, 2015 (DE) .................. 10 2015 104 715

(51) Int. Cl.
*B60R 21/215* (2011.01)

(52) U.S. Cl.
CPC .. *B60R 21/215* (2013.01); *B60R 2021/21537* (2013.01)

(58) Field of Classification Search
CPC ................................................ F16N 31/006

USPC .......................................................... 428/43
See application file for complete search history.

(56) References Cited

U.S. PATENT DOCUMENTS 6,337,461 B1 * 1/2002 Yasuda ............... B23K 26/032
219/121.62

FOREIGN PATENT DOCUMENTS

DE  10 2006 054 590 B3  1/2008
DE  10 2007 035 073 A1  2/2009

* cited by examiner

*Primary Examiner* — Brent T O'Hern
(74) *Attorney, Agent, or Firm* — Finnegan, Henderson, Farabow, Garrett & Dunner LLP

(57) ABSTRACT

A spacer fabric may include a hinge layer, a top layer, and an intermediate layer. The hinge layer may include a first tensile strength and at least one perforation. The top layer may include a second tensile strength. The intermediate layer may include a third tensile strength, and may be arranged between the hinge layer and the top layer. The first tensile strength may be higher than the second tensile strength, and the first tensile strength may be higher than the third tensile strength.

19 Claims, 3 Drawing Sheets

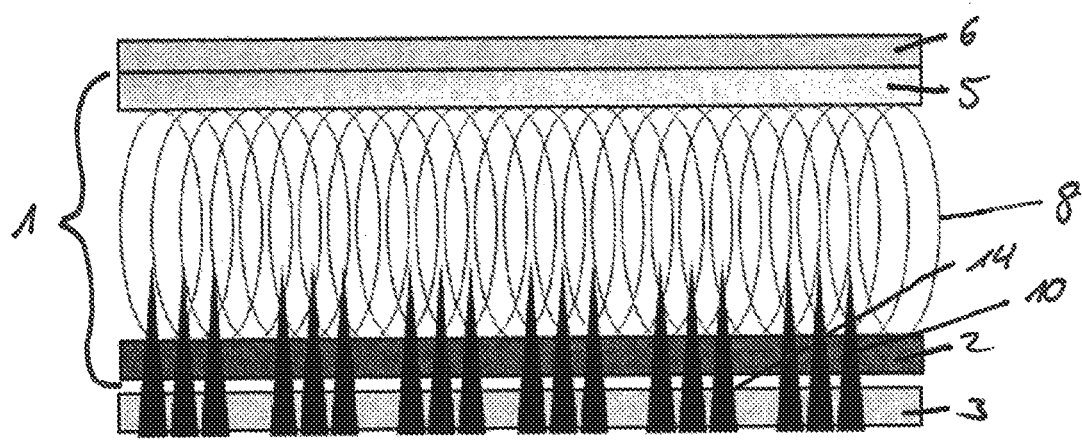
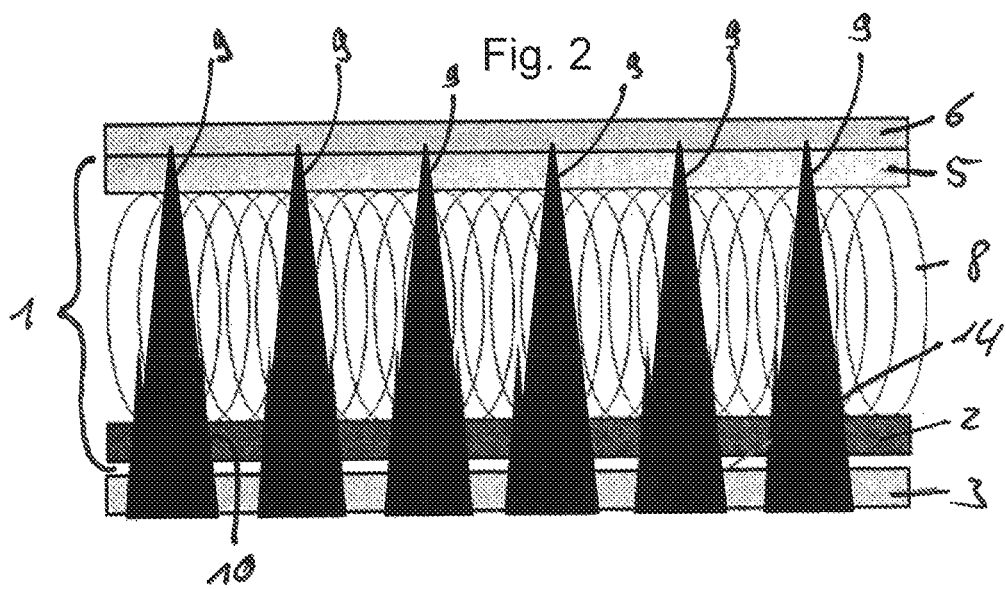

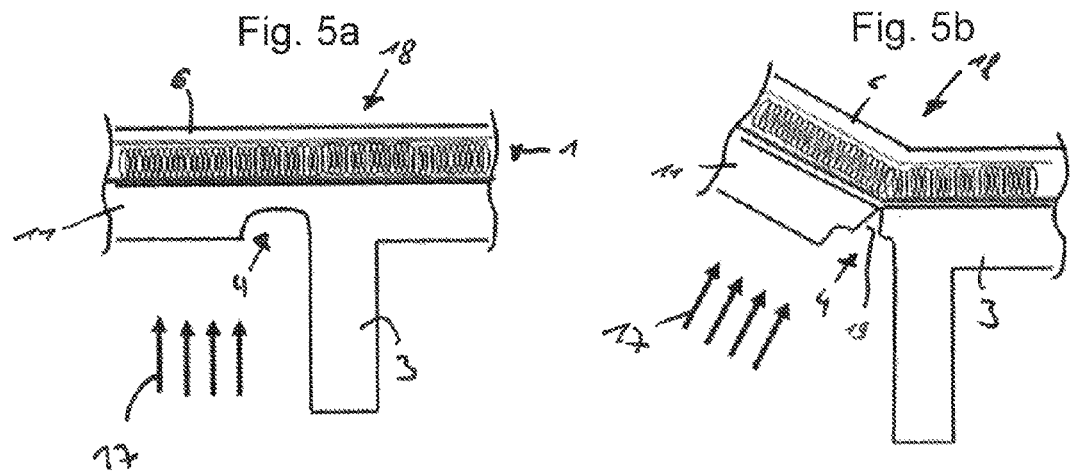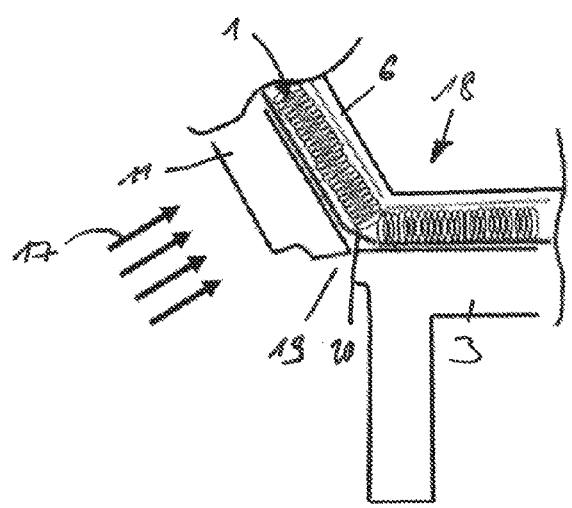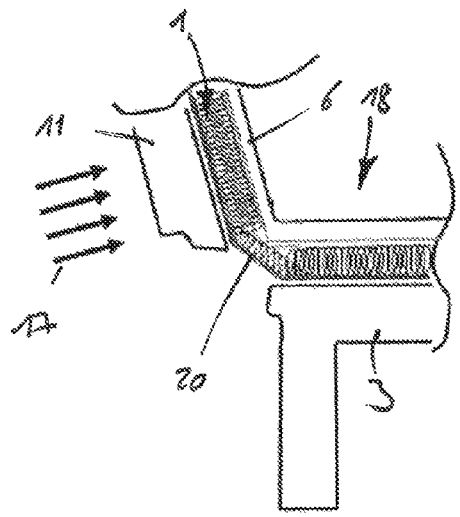

SPACER FABRIC HAVING HINGE FUNCTION

CROSS REFERENCE TO RELATED APPLICATION

This application is based upon and claims the benefit of prior German Patent Application No. 10 2015 104 715.2, filed on Mar. 27, 2015, the entire contents of which are incorporated herein by reference.

TECHNICAL FIELD

Embodiments of the present disclosure relate to a spacer fabric, which may be suitable for use in motor vehicle interiors and can be used as a hinge for an airbag flap. Embodiments of the present disclosure further relate to an airbag cover comprising such a spacer fabric.

BACKGROUND

Modern vehicles, such as automobiles, may be provided with a plurality of airbag systems. These airbag systems may minimize the risk of injury to vehicle occupants in the event of an accident. It may be desirable for airbag systems to be arranged substantially hidden in the interior of the vehicle. Thus, airbag systems may be arranged behind interior trim parts.

An airbag system is disclosed in DE 10 2007 035 073 A1, for example, which may be arranged on a side of the interior trim part situated opposite the decorative side. If the airbag is deployed, the airbag may penetrate the interior trim part. Weakening regions may be introduced in the interior trim part to form an airbag flap. The airbag flap may be additionally fastened to a textile. The textile may be generally attached to the side of the interior trim part situated opposite the visible side. This may prevent the airbag flap from detaching from the interior trim part during the opening process.

While such an airbag system may not be visible under normal conditions, such an airbag cover may have drawbacks. Because the fabric may be arranged on the side of the interior trim part situated opposite the visible side, the fabric may need to form a loop between the attachment to the airbag flap and the attachment to the carrier to ensure that the airbag flap opens wide enough and does not impede the airbag. The fabric may have a high degree of homogeneity in the region of the loop to prevent non-uniform force application during the opening process. Producing such an airbag cover therefore may cause large manufacturing effort.

SUMMARY

Embodiments of the present disclosure may simplify the integration of airbag systems in interior trim parts, without the airbag cover being visible to a vehicle occupant.

A spacer fabric according to the present disclosure may include a hinge layer and a top layer. The hinge layer may be used for attachment to a carrier. The carrier can form the shape-imparting basic structure of an interior trim part.

The carrier furthermore may include a predetermined breaking line, at least in sections. The top layer may be used to attach a decorative covering. The top layer can impart a soft feel to the spacer fabric. The spacer fabric may therefore include at least two layers. The hinge layer may have a higher tensile strength and/or higher extensibility than the top layer, at least in sections. For example, if a tensile force is applied to the spacer fabric, the hinge layer can consequently be loaded with a higher force than the top layer. The hinge layer may prevent tearing of the spacer fabric. The top layer may promote the formation of a tear.

With the hinge layer, the spacer fabric according to embodiments of the present disclosure may have a stable tear-resistant layer, which may be suitable, for example, for movably attaching an airbag flap to the interior trim part during the opening process. Thus, an additional hinge system, arranged on the side of the interior trim part facing away from the visible side, for example, may be dispensed with.

Moreover, the top layer can fulfill a haptic function that is customary for spacer fabrics. The haptic behavior can be set independently of the hinge layer as a result of the two-part design of the spacer fabric comprising a hinge layer and a top layer. For example, if a particularly soft feel is desired, this can be implemented by a corresponding design of the top layer, without adversely affecting the tensile strength and/or elasticity of the entire spacer fabric. The top layer can be used to ensure that an applied decorative covering does not influence the mechanical properties of the hinge layer. The decorative covering can be made of a leather material, a leather-like material, or sheet ware, for example.

The hinge and top layers can be made of a knitted fabric, a non-woven fabric or a woven fabric, for example, wherein the hinge layer and the top layer can differ from each other in terms of type and composition.

So as to achieve the increased tensile strength or the increased extensibility of the hinge layer, the fiber or stitch spacing of the hinge layer can be selected smaller than the fiber or stitch spacing of the top layer. This can be implemented, for example, by producing the hinge layer and the top layer using different weaving or knitting techniques.

As an alternative or in addition, it is also possible to incorporate fibers having higher tensile strength and/or having higher extensibility into the hinge layer. Fibers having high tensile strength may be polyester fibers or Kevlar fibers, for example.

It is also possible to generate the desired mechanical properties of the hinge layer by producing the hinge layer from fibers that have a higher mean thread diameter than the fibers of the top layer. While fewer fibers may absorb the same force in this case, each individual fiber may be able to absorb a greater force due to the larger diameter.

Another option is for the hinge layer to have a higher number of stitches or threads per unit area than the top layer. This can be implemented, for example, by using threads or fibers in the hinge layer which have a smaller diameter than threads or fibers that form the top layer. If the hinge layer is attached to the carrier by way of an adhesive, the smaller fibers may provide a larger surface for the adhesive, which may positively support the bond between the hinge layer and the carrier.

To increase the tensile strength and/or the extensibility, additional filler threads can be embedded into the hinge layer. The filler threads do not have to form the hinge layer itself. It is likewise possible for the filler threads to be surrounded by fibers forming the hinge layer. The filler threads may differ in diameter from the remaining fibers that form the hinge layer. If filler threads are used in the hinge layer, the remaining fibers that form the hinge layer do not have to have increased tensile strength values as well.

A tear-resistant hinge layer may be created when filler threads having high tensile strength are introduced into a hinge layer that is formed of fibers having high elasticity. For example, in the event that the filler threads should tear, despite the high tensile strength thereof, when the airbag flap is being opened, the fibers can additionally absorb energy due to the expansion of the remaining fibers of the hinge layer, which may prevent a tearing of the spacer fabric.

The filler threads may be arranged parallel to and at defined distances from each other. So as to utilize the tensile strength-enhancing properties of the filler threads, the filler threads may intersect the predetermined breaking line at least in sections at an angle of at least 15 degrees. Intersecting means that the filler threads cover (for example, bridge) the predetermined breaking point.

If homogeneous processing of the top layer and of the hinge layer is desired, increased tensile strength and/or increased extensibility can be achieved in that the materials of the top layer and of the hinge layer differ from each other. The top layer can be made of commercially available polypropylene fibers, for example, while the hinge layer may be made of polyester fibers.

To additionally optimize the haptic properties of the spacer fabric, an intermediate layer may be interposed between the hinge layer and the top layer. For example, the intermediate layer can be composed of pile threads that run substantially perpendicularly to the top layer and to the hinge layer. Alternatively, the intermediate layer can also be implemented by a foam layer, a non-woven layer, or another woven layer. The tensile strength and extensibility of the intermediate layer may be lower than that of the hinge layer.

The top layer can have an individual weakening in a region of the predetermined breaking line. With the aid of this individual weakening, defined tear formation can take place in the top layer. This may be advantageous when the individual weakening is arranged in a region of the predetermined breaking line of the carrier. The individual weakening does not have to extend exactly over the predetermined breaking line. It is also possible for an offset to exist between the individual weakening and the predetermined breaking line. The individual weakening may differ from the course of the predetermined breaking line. For example, the individual weakening can intersect the predetermined breaking line in an undulated or a zigzag-shaped manner.

Alternatively, the top layer may also comprise a weakening area, which may cover the predetermined breaking line at least in sections. For a weakening area, the spacer fabric may not require special positioning in relation to the predetermined breaking line, at least with respect to the positioning of the weakening area. This may allow the application of the spacer fabric to the carrier to be simplified.

Both the individual weakening and the weakening area can be introduced into the top layer by way of material removal or by way of material displacement. For example, the weakenings can be implemented using a laser or a cutting tool. Alternatively, it is also possible that threads or fibers are deliberately already omitted from the top layer during the production process so as to produce the weakening. The omission of threads or fibers may be advantageous for the production of a weakening area.

In addition to the top layer, the hinge layer may also comprise a weakening. It should be ensured, in addition to the hinge function, which may be ensured by the hinge layer, that opening of the carrier is made possible, for example, when the spacer fabric covers the entire predetermined breaking line, in order to allow the airbag to inflate into the interior of the vehicle. As a result of the weakening in sections, it may therefore be possible to define sections along which the hinge layer is able to tear to preserve the functionality of the airbag. The hinge layer may be either completely severed or only reduced in the region of the weakening. It is also possible to achieve a weakening by the displacement or omission of fibers.

The weakening of the hinge layer may be arranged in alignment with the predetermined breaking line. This may provide that the weakening cannot be introduced until the spacer fabric has been applied to the predetermined breaking line. This may create the predetermined breaking line and the weakening of the hinge layer in one work step.

It may be likewise possible that the hinge layer covers the predetermined breaking line only in sections. Accordingly, sections may be preserved which the airbag can readily penetrate. Additional weakening of the spacer fabric may not be necessary in these regions.

The predetermined breaking line may not have to be a continuous line. For example, the predetermined breaking line can also be formed in the carrier by a plurality of blind holes or perforation holes arranged in succession.

An airbag cover according to embodiments of the present disclosure for a motor vehicle including an airbag may include a decorative covering, a carrier, which has a predetermined breaking line, and a spacer fabric according to the present disclosure. The spacer fabric may be arranged such that the top layer is joined to the decorative covering, and the hinge layer is joined to the carrier. The predetermined breaking line may form an airbag flap. The predetermined breaking line therefore may delimit an area that breaks away from the carrier when the airbag deploys. The airbag flap can have a single- or multi-piece design. The hinge layer may cover the predetermined breaking line at least in sections, so that at least one hinge section and at least one separating section are formed along the predetermined breaking line. The hinge layer may be arranged at least in the hinge section and may have no weakenings.

The tensile strength and/or the extensibility of the spacer fabric may be reduced in the separating section. This can be implemented in that the spacer fabric and the hinge layer are locally limited to the hinge section. In the separating section, the predetermined breaking line may be covered either only by the decorative covering, or only by the top layer and the decorative covering.

Alternatively, the tensile strength and/or the extensibility can be reduced in the separating section by a weakening of the hinge layer. For example, the hinge layer can comprise a laser weakening in the separating section along the predetermined breaking line, which may promote tearing open of the hinge layer in the separating section.

This arrangement may allow the airbag cover to not be visible to the vehicle occupant during standard use. However, if the airbag is activated, the airbag may penetrate the carrier in the region of the airbag flap and reach the vehicle interior. In the hinge section, the airbag flap may be held by the hinge layer. As a result of the increased tensile strength and/or extensibility, the hinge layer may ensure that the airbag flap is retained in the region of the interior trim part and that no parts detach from the interior trim part as a result of the expansion of the airbag. In the separating section, in contrast, it may be ensured that both the carrier as well as the layers located above it can detach from the combination in a defined manner, so that proper opening of the airbag flap occurs.

To utilize the mechanical properties of the hinge layer for movably attaching the airbag flap in the hinge region, the hinge layer may be positioned relative to the predetermined breaking line such that the hinge layer has the greatest extensibility and/or tensile strength perpendicular to the predetermined breaking line. The reason for this is that the greatest forces may occur perpendicular to the predetermined breaking line if the airbag is opened.

The predetermined breaking line in the carrier may be formed by a reduction in a wall thickness. The reduction may run perpendicular to the area to which the spacer fabric and the decorative covering are applied. This reduction can already have been introduced during the production process. Alternatively, the reduction can also be provided subsequently by material removal or material displacement such as lasing, milling, cutting or drilling. To ensure that the weakening line is not apparent on the visible side, the weakening line may be arranged on a side of the carrier situated opposite the spacer fabric.

Embodiments of the present disclosure are described based on a spacer fabric and an airbag cover. Descriptions that refer to the spacer fabric can also be applied to the airbag cover and conversely, unless the feature combinations contradict each other.

Further advantages and features of embodiments of the present disclosure will be apparent from the following description. The features described can be implemented alone or in combination with one or more of the above-described features, unless the features contradict each other. The following description is made with reference to the accompanying drawings.

BRIEF DESCRIPTION OF THE FIGURES

FIG. 1 shows a first embodiment of a layer composition of an airbag cover according to the present disclosure;

FIG. 2 shows a second embodiment of a layer composition of an airbag cover according to the present disclosure;

FIGS. 5a to 5d show the schematic sequence of an opening process of an airbag cover in the region of a predetermined breaking line.

DETAILED DESCRIPTION

Figure 3:
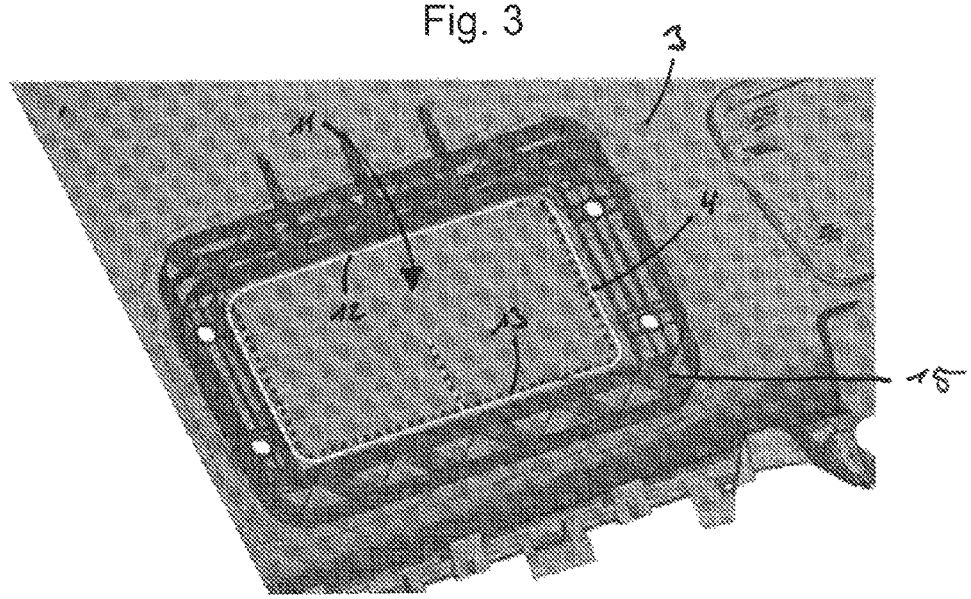
FIG. 3 shows a three-dimensional representation of an airbag cover according to the present disclosure.

FIG. 1 shows a sectional view of a spacer fabric 1 according to the present disclosure, which may be applied to an airbag cover. The spacer fabric 1 may be composed of a top layer 5, an intermediate layer 8, and a hinge layer 2. The hinge layer 2 may be joined to a carrier 3 with the aid of an adhesive, which is not shown. In the present embodiment, a dispersion adhesive may be used as the adhesive. Alternatively, a hot-melt adhesive may also be used, for example. A decorative covering 6 may be arranged on the top layer 5. The decorative covering 6 may face the interior of the vehicle and therefore may form the visible side of the airbag cover. The decorative covering 6 may likewise fastened to the top layer 5 with the aid of an adhesive, which is not shown. The intermediate layer 8 may be composed of a plurality of threads that run substantially perpendicularly to the top layer 5 and to the hinge layer 2. The intermediate layer 8 may impart an additional soft feel to the spacer fabric 1.

Perforations 14 may be introduced into the carrier 3 and into the hinge layer 2. The perforations 14 may form a predetermined breaking line 4 in the carrier 3 and a weakening 10 in the hinge layer 2. The predetermined breaking line 4 or the weakening 10 may ensure that an airbag, which is located underneath it and is not shown, can penetrate the airbag cover in a defined manner during deployment. The weakenings 10 and the perforations 14 may be created in one process step. This process step may be carried out after the spacer fabric 1 was applied to the carrier 3, so that the weakenings 10 and the predetermined breaking line 4 may be arranged in alignment with each other. The perforations 14 may be introduced using a laser. In the shown section, tearing open of the hinge layer 2 may be pursued so that a separating section 13 of the airbag cover is formed. In a further region, which is not shown, only the carrier 3 may be weakened by the perforations 14. In this region, which is not shown, the hinge layer 2 may have no weakening 10, so that a hinge section 12 may be formed.

Neither the decorative covering 6 nor the top layer 5 may be weakened in the shown exemplary embodiment. The reason for this is that the top layer 5 may already have lower tensile strength and lower extensibility than the hinge layer 2. Because the decorative covering 6 may be located directly on the top layer 5, tearing of the decorative covering 6 may also be promoted by the easily tearable top layer 5.

FIG. 2 shows an alternative layer composition of an airbag cover according to a second embodiment of the present disclosure. Perforations 14 may be introduced so as to additionally promote tear formation in the separating section 13, which may penetrate the carrier 3, the hinge layer 2, the intermediate layer 8, and the top layer 5. Moreover, the decorative covering 6 may be slightly weakened by the perforations 14. This kind of perforation may allow the tear formation to take place in a defined manner when the airbag opens. Depending on the material used, however, it may also be possible that only some of the layers are weakened or severed. It is likewise possible for the perforations 14 to end in the top layer 5, for example, or also in the intermediate layer 8.

As a result of the perforations 14, a plurality of individual weakenings 9 may be introduced into the top layer 5. While the top layer 5 may be already designed to promote tearing due to the low tensile strength thereof, the tear formation can be further optimized and defined by introducing the individual weakenings 9.

In a hinge section 12 (not shown) of an airbag cover according to the second embodiment, only the carrier 3 may have a perforation 14 for creating a predetermined breaking line 4. All layers located above it, and the hinge layer 2, may not be weakened in the hinge section 12 (see FIG. 3).

FIG. 3 shows a three-dimensional view of an airbag cover according to the present disclosure. The side of the carrier 3 situated opposite a visible side faces the observer. A predetermined breaking line 4 can be introduced into the carrier 3. The predetermined breaking line 4 may delimit an airbag flap 11, which can have a rectangular shape. An attachment geometry 15, which allows the airbag, together with the gas generator, to be attached to the carrier 3, may be arranged around the predetermined breaking line 4.

The spacer fabric and the decorative covering may be arranged on the side of the airbag cover which faces away from the observer. The spacer fabric and the hinge layer may have a weakening on three of the four sides of the airbag flap 11. These three sides may define the separating section 13. The spacer fabric may not be weakened on the fourth side, so that a hinge section 12 can be formed. When the airbag is opened during the course of an accident, the airbag may push against the airbag flap 11. As a result of the weakened hinge layer 2 in the separating section 13, all layers situated above the predetermined breaking line 4, in addition to the carrier 3, may rupture. In the present embodiment, therefore three of the four sides of the airbag flap 11 or of the predetermined breaking line 4 on the airbag flap 11 may tear.

While the airbag flap 11 is therefore able to open to allow the airbag to penetrate into the vehicle interior, the airbag flap 11 itself may be retained on the carrier 3 by the spacer fabric 1. It therefore may be ensured that no parts detach from the interior trim part when the airbag flap 11 opens.

Figure 4:
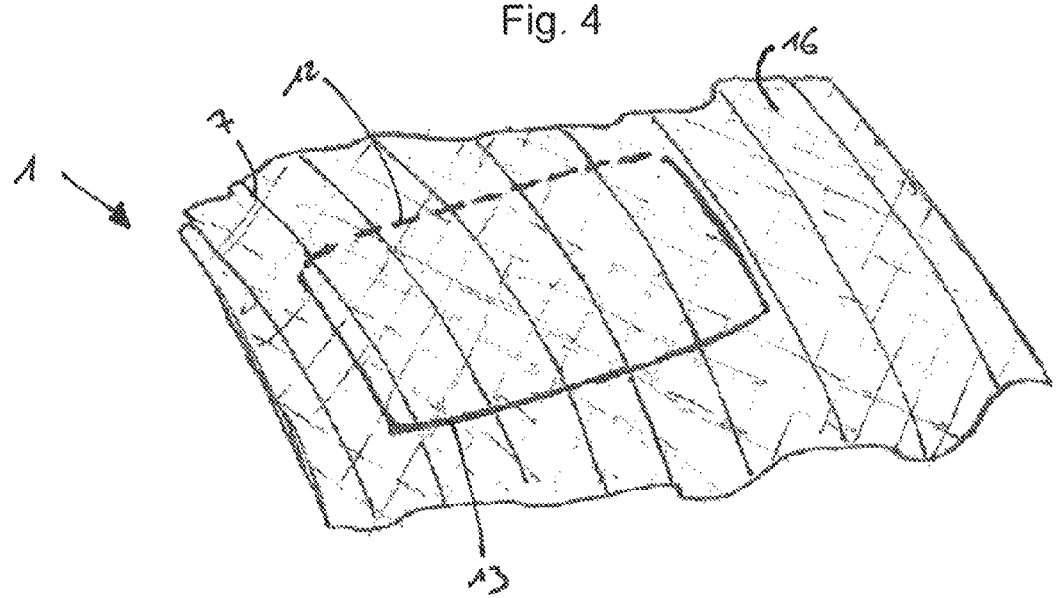
FIG. 4 shows a three-dimensional representation of a spacer fabric according to the present disclosure.

FIG. 4 shows a three-dimensional view of a spacer fabric 1 according to the present disclosure. The spacer fabric 1 may be composed of a woven top layer, which is not shown, and a woven hinge layer 2. Filler threads 7 made of polyester, which may have particularly high tensile strength, may be introduced into the woven fabric of the hinge layer 2. The woven fabric 16 of the hinge layer 2 can be composed of threads having high extensibility. The filler threads 7 can be arranged parallel to and at defined distances from each other.

The course of the hinge section 12 and of the separating section 13 is schematically shown. The filler threads 7 may run substantially perpendicularly to the hinge section 12. Thus, the tensile strength of the filler threads 7 can be utilized in the hinge section. The filler threads 7 may be severed in the separating section 13. Consequently, rupturing of the spacer fabric 1 may not be adversely affected by the filler threads 7 in the separating section 13.

FIGS. 5a to 5d show the sequence of motions of the airbag flap 11 and of the layers 1 and 6 located above it during the opening process of the airbag. A section of the carrier 3 in the hinge section 12 is shown here. When the airbag begins to expand, the airbag may push against the airbag flap 11, thereby generating a force 17 that acts on the airbag flap 11. As a result of the acting force 17, the carrier 3 may begin to break along the predetermined breaking line 4, whereby a tear 19 forms. When the airbag flap 11 has completely broken away from the carrier 3, the airbag flap may begin to move into the interior of the vehicle. In the separating section, which is not shown, the tear may propagate at this location into the spacer fabric 1 and into the decorative covering 6. However, because the airbag flap 11 may be held in the hinge section 12 by the hinge layer 2, the airbag flap 11 may rotate about the hinge section 12. The hinge layer 2 therefore may prevent tearing of the spacer fabric 1. The increased extensibility of the hinge layer 2 may ensure that the hinge layer 2 does not rupture under the abrupt influence of force 17. This rotational movement may cause the airbag flap 11 to be moved out of the deployment direction of the airbag, and the airbag may be able to deploy past the airbag flap 11.

The explanations provided with reference to the figures are purely illustrative and shall not be understood to have any limiting effect.

What is claimed is:

1. A spacer fabric, comprising:
   a hinge layer having a first tensile strength, wherein the hinge layer includes a plurality of threads and at least one perforation;
   a top layer having a second tensile strength, wherein the top layer includes a plurality of threads; and
   an intermediate layer having a third tensile strength, wherein the intermediate layer is arranged between the hinge layer and the top layer, the first tensile strength is higher than the second tensile strength, and the first tensile strength is higher than the third tensile strength, wherein the hinge layer has a higher number of threads per unit area relative to a number of threads per unit area of the top layer.

2. The spacer fabric according to the claim 1, wherein the hinge layer comprises a smaller stich spacing relative to a stich spacing of the top layer.

3. The spacer fabric according to claim 1, wherein the hinge layer comprises at least one fiber that forms the first tensile strength.

4. The spacer fabric according to claim 1, wherein the hinge layer has a higher average thread diameter relative to an average thread diameter of the top layer.

5. The spacer fabric according to claim 1, wherein the hinge layer comprises a plurality of filler threads.

6. The spacer fabric according to claim 5, wherein the plurality of filler threads are arranged parallel to each other.

7. The spacer fabric according to claim 1, wherein the hinge layer and the top layer comprise different materials.

8. The spacer fabric according to claim 1, wherein a carrier is applied to the hinge layer, and the carrier includes a predetermined breaking line formed by the at least one perforation.

9. The spacer fabric according to claim 8, wherein the hinge layer comprises a plurality of filler threads, and the plurality of filler threads intersect the predetermined breaking line.

10. The spacer fabric according to claim 8, wherein the top layer comprises at least one individual weakening.

11. The spacer fabric according to claim 10, wherein the at least one individual weakening is arranged at a position offset from the predetermined breaking line.

12. The spacer fabric according to claim 10, wherein the at least one individual weakening is arranged at a position in alignment with the predetermined breaking line.

13. The spacer fabric according to claim 8, wherein the hinge layer is configured to cover the predetermined breaking line in a first section and form a separating section along the predetermined breaking line.

14. The spacer fabric according to claim 1, wherein a decorative layer is applied to the top layer.

15. A spacer fabric, comprising:
    a hinge layer having a first tensile strength, wherein the hinge layer includes at least one perforation and at least one fiber that forms the first tensile strength;
    a top layer having a second tensile strength; and
    an intermediate layer having a third tensile strength, wherein the intermediate layer is arranged between the hinge layer and the top layer, the first tensile strength is higher than the second tensile strength, and the first tensile strength is higher than the third tensile strength.

16. The spacer fabric according to claim 15, wherein the hinge layer comprises a plurality of filler threads arranged parallel to each other.

17. A spacer fabric, comprising:
    a hinge layer having a first tensile strength, wherein the hinge layer includes at least one perforation and a plurality of filler threads;
    a top layer having a second tensile strength; and
    an intermediate layer having a third tensile strength, wherein the intermediate layer is arranged between the hinge layer and the top layer, the first tensile strength is higher than the second tensile strength, and the first tensile strength is higher than the third tensile strength.

18. The spacer fabric according to claim 17, wherein the plurality of filler threads are arranged parallel to each other.

19. The spacer fabric according to claim 17, wherein the hinge layer comprises at least one fiber that forms the first tensile strength.

* * * * *